Figure 1:
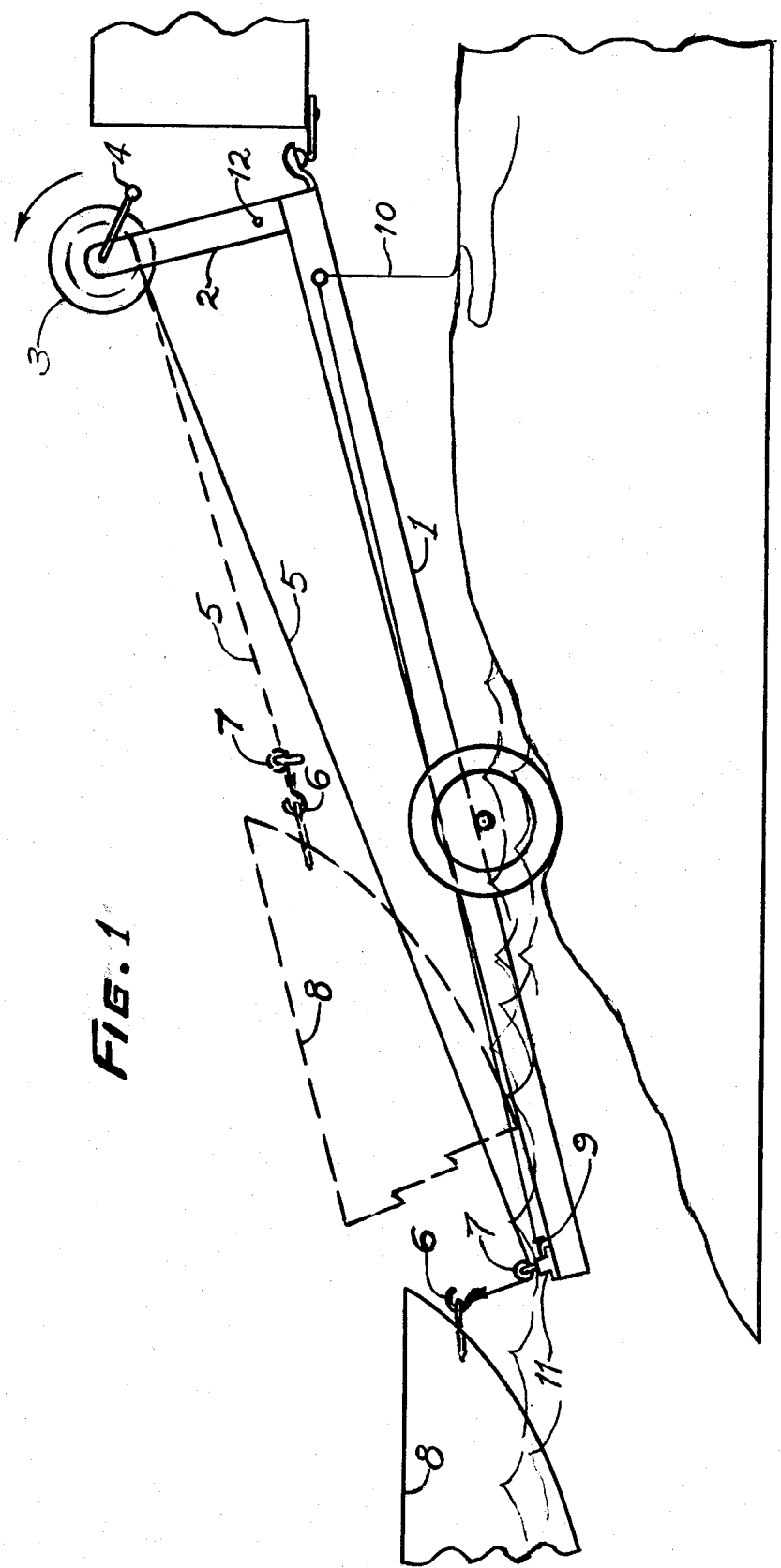

United States Patent [19]

Hosie

[11] 4,211,513
[45] Jul. 8, 1980

[54] BOAT LOADING DEVICE

[76] Inventor: Alistair M. Hosie, 219 Superior St., Victoria, B.C., Canada, V8V-1T4

[21] Appl. No.: 886,523

[22] Filed: Jun. 16, 1978

[51] Int. Cl.$^2$ ................................................ B60P 3/10
[52] U.S. Cl. .................................... 414/559; 254/410; 403/324
[58] Field of Search ............... 414/500, 506, 538, 559; 254/190 R, 192, 194–196, 166; 280/414 R; 403/165, 324; 193/35 MD

[56] References Cited

U.S. PATENT DOCUMENTS

| | | | |
|---|---|---|---|
| 353,218 | 11/1886 | Harrington | 403/324 X |
| 393,051 | 11/1888 | Aiken | 193/35 MD |
| 2,576,355 | 11/1951 | Parmesan | 414/538 |
| 2,799,408 | 7/1957 | Overton | 254/166 X |

*Primary Examiner*—Robert G. Sheridan
*Attorney, Agent, or Firm*—Christensen, O'Connor, Johnson & Kindness

[57] ABSTRACT

This invention is a releasable pulley device that can be readily attached to the center rear of a boat trailer and through which the tow-in line for a boat is threaded. As the boat is winched in to the rear of the trailer an alignment of the prow with the center rear of the trailer is effected. The pulley device is released from its seating and rides free on the line as the boat is fully winched on to the trailer. This enables the dry loading of a boat from rough water as a one-man operation.

5 Claims, 3 Drawing Figures

BOAT LOADING DEVICE

This invention relates to a boat loading device that consists of an attachment that is mounted on the rear of a conventional boat trailer. The device overcomes the present difficulty of aligning the prow of the boat with the centre rear of the trailer when the boat is to be taken out of rough, choppy water. It enables, as well, the user of the boat to make his connection between the trailer winch and the prow of the boat from dry land even though the trailer has been backed into the water at the shoreline.

The main components of this invention are a mounting block for attachment to the centre frame member of the trailer at its rear end, a pair of bore holes at right angles, one in the top of the mounting block and one in the side thereof with the bore holes being interconnected, and a pulley support shaft for releasable seating in whichever bore hole will accommodate it in a vertical position. The release means is a manually operated detent to be further described.

The co-operating elements on the trailer and their function will now be set out. A single tow-line with a hook on the end is paid out or reeled in from a winch stand at the front of the trailer. This tow-line runs underneath the releasable pulley at the rear of the trailer and stays in that relative relationship at all times. The hook at the free end of the tow line is unhooked from the prow of the boat for launching, is drawn back to the winch stand while the boat is in the water, and is paid out when the boat is to be loaded back into the trailer.

To load the boat, the boat is drawn up beside the trailer on the windward side and partially out of the water. The winch line with the hook on its free end is unhooked from a keeper hole on the winch stand, some line is paid out and the hook is attached to an eye on the prow of the boat. It should be noted that this line is still threaded under the releasable pulley at the rear of the trailer.

The boat, with line attached, is then pushed back into the water. The line is reeled back onto the winch and the boat prow is homed in to the location of the releasable pulley at the centre rear of the trailer. At this point, the releasable pulley shaft is released from its seat and the said pulley rides free on the winch line as the boat is reeled fully up onto the trailer.

The detent for effecting the release of the pulley shaft consists of a spring loaded pin that engages an annular groove near the base of the pulley shaft. The detent is withdrawn manually by a line that is attached to it.

The reason for the pair of interconnected bores holes in the mounting block at right angles to each other is to provide vertical position seating for the releasable pulley shaft whether the mounting block is top mounted or side mounted on the central longitudinal frame member of the trailer. The same detent pin location is operable for either bore hole that the pulley shaft is seated in.

The invention will now be described in conjunction with the accompanying drawings, wherein FIG. 1 shows a boat in two positions of loading onto the boat trailer.

Figure 2:
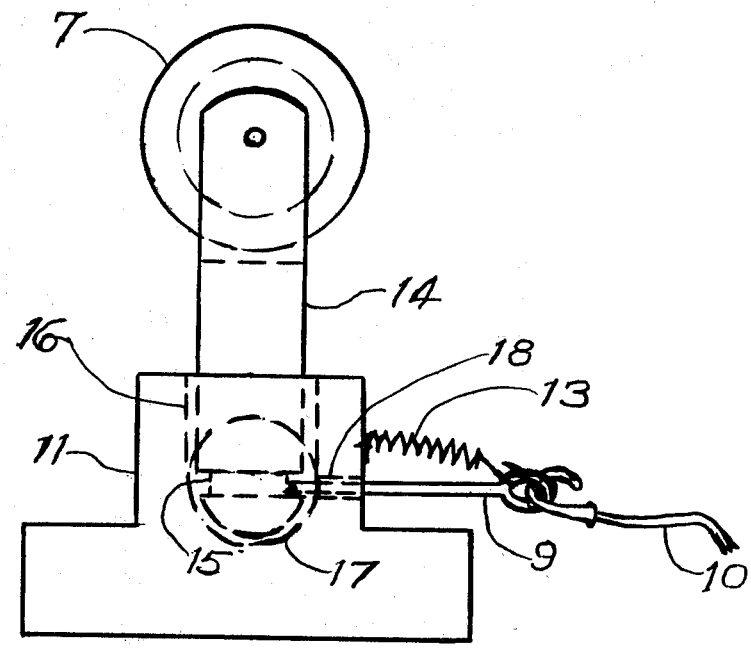
Figure 3:
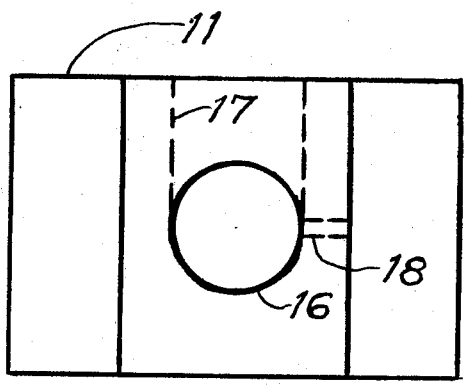

FIG. 2 is an elevation of the mounting block and the releasable pulley shaft, and FIG. 3 is a plan view of the mounting block with the pulley shaft removed.

With reference to FIG. 1, the boat trailer is shown at 1, the winch stand 2 at its forward end supports a winch 3 that is manually operated by a crank 4. The winch line 5 has been threaded under releasable pulley 7, a hook 6 attached to the free end of the line for engagement with an eye in the prow of the boat. The releasable pulley 7 is still in its seat 11 and this causes the boat 8 to be drawn into alignment with the centre rear of the trailer.

At this point the manual release of the detent pin 9 is effected through pull line 10. The tension of winch line 5 and the retraction of detent pin 9 lifts releasable pulley 7 out of its seat 11. As the boat is winched further up onto the trailer, pulley 7 rides free on winch line 5.

When the boat is out in the water, the winch line 5 with the hook at its free end is drawn back to a keeper hole 12 at the base of the winch stand. This extra length of winch line is further increased when it is desired to hook onto the boat to mount it back on the trailer.

As shown in FIG. 2, the releasable pulley 7 and its shaft 14 are retained in seat 16 in the mounting block 11 by means of an annular groove 15 near the base of shaft 14 and a co-operating spring loaded detent pin 9. The spring loading for the detent pin is provided by a tension spring 13. Seat 16 is in the form of a blind bore hole and an interconnected bore hole at right angles to it is shown at 17 in FIGS. 2 and 3. In a situation of small clearance between boat keel and trailer and a side mounted location for block 11, bore hole 17 would provide the seat for pulley shaft 14.

As shown in both FIGS. 2 and 3, a clearance hole 18 is provided for free movement of detent pin 9.

FIG. 3 is a plan view of mounting block 11 with the pulley shaft removed. It shows more clearly the interrelationship of bore holes 16 and 17.

The means of attaching the mounting block to the trailer frame member may be U-bolts, ring clamps or direct bolting.

It is thus seen that the loading device of this invention can be used with any conventional boat trailer, is simple to mount and permits the dry loading of a boat from rough water. What was once a two-man operation can now be performed by one person. It also avoids the somewhat dangerous practice of a person walking back on a slippery trailer to draw the prow of the boat in to the centre rear of the trailer.

The embodiments of the invention in which an exclusive property or privilege is claimed are defined as follows:

1. In combination with a boat trailer adapted to be towed and having an elongated bed provided with support means for cradling a boat in centered position loaded on the trailer, and further provided with a loading winch stationed at its forward end including a loading line extendable therefrom to be fastened to the bow of the boat for loading the same from the water onto the trailer, guide means in running engagement with the loading line by which to draw the bow of the boat to the after end of the trailer in transversely centered loading position, said guide means comprising a captive line guide through which the line is free to run and that remains captive on the line, and line guide mounting means fixed in transversely centered position on the trailer bed adjacent the after end thereof, said line guide being engageable with the mounting means for locating the line guide substantially at the level of the bed while drawing the boat into loading position, and being selectively releasable from such mounting means thereafter to permit loading of the boat onto the trailer from such loading position.

2. The combination defined in claim 1, wherein the line guide comprises a pulley rotatively mounted on one end of a support shaft, and wherein the mounting means comprises a block having a receptacle hole therein slidably receiving the shaft, and manually releasable detent means in the block holding the shaft in said receptacle hole, including a pull line extendable to the forward end of the trailer for releasing the detent by pulling on such line.

3. The combination defined in claim 2, wherein the block has two similar receptacle holes oriented substantially at right angles to each other.

4. The combination defined in claim 1, wherein the line guide is engageable and disengageable in relation to the mounting means in a direction transverse to the loading line when the latter is stretched under tension between the winch and the boat during loading, whereby line tension exerts disengagement force on the line guide to withdraw the same from the mounting means when released therefrom.

5. The combination defined in claim 4, wherein the line guide comprises a pulley rotatively mounted on one end of a support shaft, and wherein the mounting means comprises a block having a receptacle hole therein slidably receiving the shaft, and manually releasable detent means in the block holding the shaft in said receptacle hole, including a pull line extendable to the forward end of the trailer for releasing the detent by pulling on such line.

* * * * *